United States Patent Office 3,374,169
Patented Mar. 19, 1968

3,374,169
ORGANIC LIQUIDS THICKENED WITH
TREATED SILICA MATERIALS
Nelson H. Kasten and Harry Teicher, St. Louis, Mo., assignors to Monsanto Company, St. Louis, Mo., a corporation of Delaware
No Drawing. Filed Feb. 7, 1966, Ser. No. 525,333
12 Claims. (Cl. 252—28)

ABSTRACT OF THE DISCLOSURE

The present invention relates to a thickening agent comprising silica material such as fume silica or a silica aerogel and a silicone glycol copolymer having the general formula

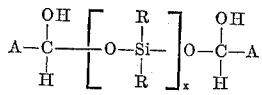

wherein R is an alkyl group having 1 to 4 carbon atoms; A is either hydrogen, an alkyl group having 1 to 3 carbon atoms, or a hydroxy substituted alkyl group having 1 to 3 carbon atoms; and $x$ is an integer representing the number of units in the molecular chain and has a value of 1 to 25. The aforesaid novel thickening agent is utilized for increasing the viscosity and thixotropy of a variety of organic liquids, such as an oleaginous liquid, a liquid organic resin, and the like. Such organic liquids containing the novel thickening agent comprise another embodiment of this invention.

---

The present invention generally relates to liquids thickened with novel thickening agents. More particularly, the present invention relates to organic liquid compositions or formulations containing, for example, plastic or resinous substances and thickened with small amounts of certain novel compounds particularly certain treated silica materials.

The desirability of thickening organic liquids for use in certain applications has been widely recognized and it has been proposed heretofore to thicken a variety of such liquids by incorporating therein inert inorganic materials including mica, diatomaceous earth, talc, alumina, graphite, and the like, and in particular, silica aerogels. For example, it has been proposed, in U.S. Patent 2,260,625, issued to Samuel S. Kistler, to thicken oily liquids, such as lubricating oils, and to convert such oils into greases by incorporating silica aerogels in amounts up to as high as 50% in such oils. Silica aerogels described in U.S. Patent 2,285,449, issued June 9, 1942, to Morris D. Marshall and U.S. Patent 2,285,477, issued June 9, 1942, to John F. White have also been used to thicken oils. Also for example, it has been proposed in U.S. Patent 2,892,730, issued to Harry Kloepfer and Otto Schweitzer, to thicken organic liquids containing high molecular weight film formers, such as nitrocellulose, cellulose acetate, polyvinyl acetate, chlorinated rubber and the like dissolved in organic solvents, with oxides of silicon, aluminum and titanium, to prevent the settling of mineral fillers therefrom.

It has also been proposed in U.S. Patent 2,610,960, issued to Birger W. Nordlander, to thicken, and/or render thixotropic, coating and filling compositions such as polymerizable organic liquids consisting of liquid polyester resins by the incorporation of vermiculite in an amount as high as 50% by weight of the vermiculite in such liquids. It has also been proposed in U.S. Patent 2,887,461, issued to Eugene V. Horst, to render thixotropic, laminating compositions consisting of solid polyester resins dissolved in styrene by the incorporation of silica aerogels, such as the silica aerogel described in the aforesaid Kistler, Marshall, or White patents or mixtures of such silica aerogel and alumina in amounts as high as 20% by weight of such inorganic materials in the liquids. By thickening and/or rendering such liquids thixotropic, it has been possible to overcome the problem of drainage of such compositions away from the coated or filled objects to which the composition has been applied.

In U.S. Patent 3,210,273, issued to Thomas A. Taulli, it has also been proposed to thicken organic liquid compositions by the incorporation therein of amorphous organo-silica aerogels having certain physical and chemical characteristics different from the aforementioned Marshall and White aerogels.

However, the above-described thickening agents possess certain disadvantages, in that (except for the aerogels of the Taulli patent) relatively large amounts of such materials are required to significantly thicken or increase the viscosity of organic liquids and/or render these liquids capable of forming thixotropic gels. Thus, for example, the thickening agents when used in large quantities, in some instances, adversely affect the properties of such organic liquids or the use thereof, while in other instances, the cost of these thickening agents renders their use, in the large quantities normally required, economically prohibitive. Although silica aerogels of the type described in the aforementioned Marshall or White patents have been used as thickening agents for oils, the commercial utility of these materials for thickening polymerizable organic liquids, such as plastisols, polyesters and epoxide resins, prior to the curing of these materials is not of general applicability under all conditions of mixing and concentrations of silica desired. In using liquid resins (particularly the polymerizable resins, for example, polyesters or solutions thereof) the liquids are applied as filling and coating compositions or films as desired, following which the curing of the resin is caused to take place. One of the problems encountered in applying liquid resins, for example, in the fabrication of laminates such as fiber glass, is the tendency of the liquid to flow or drain away from the surface to which it is applied when such surface is not disposed in the horizontal plane as is frequently the case. Thus, it has been necessary to incorporate relatively large amounts, e.g., usually in excess of 10% by weight, of the silica aerogels of Marshall and White in such polymerizable liquids to obtain thickening and prevent drainage, although it is known that amounts in excess of 5% or 6% by weight of a silica aerogel in such liquids usually adversely affect the properties of the polymers when cured. Generally stated, the silica aerogels per se of the type described in the aforementioned Marshall or White patents are relatively inefficient at lower concentrations, i.e., <10%, and uneconomical at higher concentrations, i.e., >10%, for use as thickening agents for organic liquids.

The disadvantage associated with the aerogels of the Taulli patent, U.S. 3,210,273, is that while organic liquids can be thickened by incorporating therein the Taulli aerogels per se, the viscosities of the thickened liquids are not as high as may be desired in certain instances and in certain organic liquids, particularly at low silica weight levels (for example, 2% by weight or less). Consequently, there is a need for thickening agents which impart thixotropy and which are even more efficient as thickeners on a weight basis than those disclosed in the Taulli Patent U.S. 3,210,273.

In accordance with the present invention, it is possible to thicken organic liquids by incorporating in such liquids certain hereinafter defined thickening agents which are improved and more efficient as thickeners for a variety of organic liquids than those silica aerogels heretofore known in the prior art.

Accordingly, it is one object of the present invention to provide organic liquids thickened with novel thickening agents.

It is another object of this invention to provide compositions comprising organic liquid oily or lubricating substances thickened with relatively small amounts of certain treated silica materials.

It is also an object of this invention to thicken organic liquids economically and/or without appreciably altering the useful properties of such liquids or the end products made therefrom.

It is a more particular object of the present invention to provide compositions comprising liquid plastisols or resins thickened and/or made thixotropic by the incorporation therein of relatively small amounts of certain novel treated silica materials and which are useful in a wide variety of commercial applications.

These and other objects and advantages of the present invention will become apparent from the following description and the appended claims.

Generally speaking, the novel compositions of the present invention comprise a mixture of (a) an organic liquid; (b) a silica material as described in detail hereinafter; and (c) a liquid silicone glycol copolymer having the formula

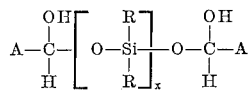

wherein R is an alkyl group having 1 to 4 carbon atoms, for example, methyl, ethyl, N-propyl, N-butyl, and the like; A is selected from hydrogen, alkyl groups having 1 to 3 carbon atoms (such as methyl, ethyl, and propyl), and hydroxy substituted alkyl groups having 1 to 3 carbon atoms (such as —$CH_2OH$, —$C_2H_4OH$, —$C_3H_6OH$, and the like); and $x$ is an integer representing the number of units of

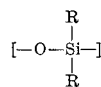

in the molecular chain and, for example, has a value of from about 1 to about 25, preferably from about 5 to about 15. The novel thickening agent of the present invention, more specifically described hereinafter, comprises the above items (b) and (c) and such agent is present in an amount sufficient to increase the viscosity of the aforementioned organic liquid.

The preferred silicone glycol copolymers are further characterized in having a viscosity of from about 10 to about 4,000 centistokes measured at 25° C. Such copolymers are generally relatively clear liquids of amber to straw color and can be obtained in a wide range of viscosities as determined by the length of the polymer chain. Particularly effective types of the silicone glycol copolymers employed in the practice of this invention and which fall within the scope of the formula given above are available commercially under the trade designations DC 113, DC 199, and UC 531.

The total amount of the silica material, hereinafter defined, and the silicone glycol copolymer used should be sufficient to increase the viscosity of the aforementioned organic liquid in which they are incorporated, but preferably should not exceed about 10% by weight of the organic liquid. Specifically, the amount of silica material used is from about 0.05% to about 6.0%, preferably from about 0.5% to about 3.0%, by weight, based on the weight of the organic liquid, and the amount of silicone glycol copolymer used is from about 0.02% to about 5.0%, preferably from about 0.5% to about 3.0%, by weight based on the weight of the silica material used.

The silicone glycol copolymer apparently functions as a thickening synergist for the silica material when incorporated therewith into the aforementioned organic liquids. Furthermore, it has been observed that the method of incorporating the silica material and the silicone glycol copolymer in the organic liquid is not critical. Specifically, the copolymer can be intimately admixed or contacted with the silica material, thus providing a "coating" on the silica material, prior to incorporating these two ingredients in the said liquid. On the other hand, the silica material and the copolymers can be introduced separately and/or at different times into the organic liquid; for example, the silica material can be dispersed in the organic liquid followed by the dispersion of the silicone glycol copolymer in the organic liquid. The increase in viscosity of the organic liquid consequently is substantially the same whether the silica material and copolymer are intimately admixed prior to incorporation in the organic liquid or whether the silica material and copolymers are separately introduced into the organic liquid. However, it was observed, when conducting the experiments described herein, that incorporating the silicone glycol copolymer per se in the organic liquid did not increase the viscosity of such liquid. It is to be understood, then, that the term "combination of silica material and silicone glycol copolymer" as used herein includes both of the aforementioned methods of incorporating the silica material and said copolymer in the organic liquid. These two ingredients, in combination, thus constitute the thickening agent for the organic liquid. The combination of silica material and silicone glycol copolymer and the term "thickening agent" are intended to be synonymous and are used interchangeably herein.

In the past, a wide variety of commercially available silica products such as silica gels, arc silicas, fume silicas, precipitated silicas, and silica hydrogels or aerogels have been suggested for use as thickening agents. However, it has unexpectedly been found, in accordance with the present invention, that only the silica aerogels and fume silicas are suitable in combination with the silicone glycol copolymers (which fall within the scope of the above described formula) to effectively thicken an organic liquid using low concentrations of the silica material. In brief, the other silica products such as arc silicas, precipitated silicas and the like, are not effective thickening agents whether used alone or with the silicone glycol copolymers heretofore defined. It is to be noted that the term "silica material" as utilized herein is thus restricted to the silica aerogels, fume silicas, and mixtures thereof.

One preferred class of the operative silica materials is an amorphous silica aerogel which can be combined with a silicone glycol copolymer for use in the compositions of this invention. This class of aerogels consists of a finely divided, amorphous, silica aerogel comprising a silica polymer having siloxy groups. Such silica aerogels are usually characterized in having from about 0% to about 1.5% by weight of carbon. Furthermore, said aerogels usually contain from about 0% to about 1.7% by weight hydrogen. Preferably, these silica aerogels have an average particle size of from about 0.5 to 5 microns, and a specific surface area of from about 50 to about 500 square meters per gram.

A particularly suitable class of organo-silica aerogels which are preferred for use in the present invention are those organo-silica aerogels which are set forth in the Taulli Patent U.S. 3,210,273 which is hereby incorporated herein by reference. The Taulli aerogels are usually characterized in having from about 0.4% to about 1.2% by weight of carbon (stated differently, the $SiO_2$ to carbon atom ratio is in the range of from about 10:1 to about 50:1). Furthermore, the Taulli aerogels usually contain from about 0.9% to about 1.5% by weight of hydrogen (stated differently, the $SiO_2$ to hydrogen atom ratio is in the range of from about 0.77:1 to about 2:1). These preferred areogels are usually further characterized in having an average particle size of from about 1.0 to about 2.5 microns, a specific surface area of from about 100 to about 400 square meters per gram, and an external surface area of from about 1.70 to about 1.95 square meters per gram.

As previously pointed out, a wide range of silica aerogel materials may be combined with the silicone glycol copolymers and subsequently incorporated in the novel compositions of the present invention. Table I sets forth typical analysis of some of the various aerogel materials commercially available and which can be used in the present invention. It is to be noted with reference to the aerogel materials which may be used in the present invention that certain prior art silica aerogels—heretofore not efficient as thickeners—can be utilized in the present invention in minor amounts in combination with the silicone glycol copolymers described herein. Such prior art silica aerogels per se were required to be used in large quantities, i.e. usually greater than 10% by weight based upon the weight of the material to be thickened. Such prior art silica aerogels are those described in United States Patents 2,093,454; 2,285,449; and 2,285,477, all of these patents being incorporated herein by reference.

In addition to the utilization of silica aerogels with the silicone glycol copolymers, there are the previously mentioned fume silicas which are generally referred to as such because said silicas are prepared by the reaction of silicone tetrachloride, hydrogen, and oxygen (supplied as air) in furnaces operated at high temperatures. Some of the well-known fume silicas are commercially available under the trademarks "Cab-O-Sil" and "Aerosil." These materials may be prepared in the manner more specifically described in Industrial and Engineering Chemistry, volume 51; No. 3; March 1959; pages 232–238. Table I also illustrates some of the properties of these fume silicas.

ployed in compositions comprising any of the hereindescribed organic liquids to thicken, i.e. render thixotropic, and/or increase the viscosity of such liquids to a greater degree than when employing the prior art silica materials per se.

The term "thixotropic" is used herein to denote the property of certain organic liquids, containing the thickening agent (i.e. silicone glycol copolymer and organo-silica aerogels or fume silicas), to thicken and to change rapidly, on standing, from a liquid into a gel-like solid mass or body having sufficient cohesive strength to withstand distortion by gravitational force when suspended freely in an inverted receptacle or on a coated object. The gel is also of such a nature that it can be fluidized by the application of mechanical agitation as by shaking, stirring, vibrating, and the like. The property of thioxtropy as understood herein is thus characterized by a reversible isothermal sol$\rightleftharpoons$gel transition.

Classes of organic liquids having a relatively low viscosity, e.g., in the range of from about 2.5 to 25 millipoises at 25° C. can be employed in combination with the silicone glycol copolymer-silica material (thickening agent) to provide compositions having a viscosity appreciably above 25 millipoises and up to 500 or more centipoises at such temperature. Such organic liquids may be organic solvents, for example, solvents used in paint, varnish or lacquer removers, and include liquids such as aliphatic and aromatic alcohols, ketones, and esters, for example, ethanol, acetone, methyl ethyl ketone, ethyl acetate, amyl acetate and the like.

Also, classes of organic liquids having relatively higher viscosities, e.g., viscosities ranging from about 100 to 600 centipoises at 25° C., can be used with the silicone glycol copolymer and silica material to provide compositions having viscosities of from 1,000 to 8,000 (or more) centipoises measured at 25° C. Such organic liquids include classes of oleaginous liquids such as oils of animal and vegetable origin, for example, cod liver oil, olive oil, corn oil, and the like. Also included in the oleaginous liquids are lubricating oils such as hydrocarbon motor oils and these may be employed in conjunction with the thickening agent to provide gel-like bodies having a grease consistency. Furthermore, mixtures of the aforementioned oils may be thickened by the practice of the present invention.

Other classes of organic liquids which may be thickened and/or rendered thixotropic include organic film-formers, i.e. film-forming organic liquids, such as liquids containing a dissolved organic film-forming, or bonding, solid or liquid which, on evaporation of such liquid or by polymerization during or after evaporation of such organic liquid, forms films, coatings, or a binder which

TABLE I

| Typical Analysis | Types of Silica Materials [1] | | | | |
|---|---|---|---|---|---|
| | 1 | 2 | 3 | 4 | 5 |
| Packaged Bulk Density (lbs./cu. ft.) | 6.0 | 6.0 | 5.0 | 2.5 | 2.5–7.0 |
| Volatiles at 600° C., percent | 4.0 | 4.4 | 5.0 | 5.5 | 1.3 |
| Equivalent Sodium Sulfate, percent | 2.5 | 0.03 | 0.03 | 2.5 | <0.1 |
| pH 4% Slurry at 25° C | 3.8 | 3.8 | 3.6 | 4.0 | 3.5–4.0 |
| Surface Area (sq. meters/gm.) | 130 | 260 | 260 | 280 | 175–200 |
| Oil Absorption (gms. oil/gm.) | 2.6 | 3.5 | 3.5 | 3.7 | |
| $SiO_2$, percent | 92–94 | 94–96 | 94–96 | 90–92 | 99.0–99.7 |
| Absolute Density (lbs./gal.) | | 17.1 | | | |
| Average Agglomerate Size (microns) | 5.0 | 5.0 | 3.0 | 2.9 | |
| Ultimate Particle Size (microns) | 0.01–0.02 | 0.01–0.02 | 0.01–0.02 | 0.01–0.02 | 0.015–0.020 |

[1] Silica materials designated 1 through 4 are different grades of silica aerogels and are commercially available under the trademark Santocel. No. 5 is a fume silica commercially available under the trademark Cab-O-Sil M-5.

The organic liquids which may be employed in the compositions of this invention are exemplified by liquids such as liquid organic resins, organic solvents, liquid organic film-formers, oleaginous liquids, mixtures thereof, and the like. Generally these organic liquids per se have a viscosity in the range of from about 2.5 millipoises to about 4,000 centipoises at a temperature of about 25° C.

As stated above, the silica material, i.e. aerogel or fume silica, and silicone glycol copolymers may be emis capable of bonding two similar (e.g., glass fibers) or two dissimilar materials with a relatively high strength bond.

For example, liquid coating compositions comprising solutions of high molecular weight film-formers dissolved in organic solvents may be thickened by dispersing in the solution from about 0.05% to about 2.0% by weight, based on the weight of the solution of a silica aerogel or fume silica and as little as 0.02% by weight, based on the weight of the aerogel, of a silicone glycol copolymer. Also certain organic liquid polymers may be made thixotropic by dispersing therein from about 0.5% to about 3.0% by weight, based on the weight of the composition, of a silica aerogel or fume silica and from about 0.02% to about 3.0% by weight, based on the weight of the aerogel, of a silicone glycol copolymer. Such compositions are generally employed as adhesives, films, foils, lacquers, paints, stretching lacquers (dopes) and the like and comprise solutions or suspensions of high molecular weight organic film-formers such as, for example, nitrocellulose, cellulose acetate, chlorinated rubber, polyvinyl acetate, polyvinyl chloride, polyacrylic esters, cellulose butyrate, cellulose propionate, and the like, which are dissolved or suspended as fine particles in organic solvents or liquids such as, for example, acetone, ethanol, ethyl acetate, amyl acetate, dioctyl phthalate, etc.

The above organic film-forming compositions usually contain from about 40% to 50% by weight of film-formers dissolved or suspended in an organic solvent or liquid and may often have a dispersed phase consisting essentially of pigments or fillers. Where it is desired that the above-described liquid compositions be applied to objects in the form of a spray or spreadable liquid, the addition of from about 0.05% to 3% by weight (depending upon the amount of film-forming materials in the composition) of the silica materials together with from about 0.02% to about 3.0% by weight of a silicone glycol copolymer (based on the weight of the silica) to such compositions will cause the formation of a thixotropic gel composition almost immediately on contact with the object to which they are applied and such gel composition will then not run or drain from such objects.

Among the liquid organic resin compositions referred to above which may be employed with the silica aerogels or fume silicas in combination with the silicone glycol copolymer as particularly useful composition embodiments of this invention are plastisol compositions comprising halogenated vinyl or vinylidine resins such as, for example, an emulsion polymerized polyvinyl chloride polymer suspended in a plasticizer such as a phthalate ester, for example, dioctyl phthalate, dibutyl phthalate, dihexyl phthalate, ethyl hexyl phthalate and the like, in which the plasticizer chosen is a plasticizer for the resin employed. Such plastisol compositions are described in U.S. Patent 2,852,482, issued Sept. 16, 1958, to Paul R. Graham and U.S. Patent 2,885,378, issued May 5, 1959, to Joseph R. Darby. Since plastisol compositions are used as films for coating molds, they must be liquid or at least have some degree of fluidity (that is, flow characteristics). However, when in the liquid state, the halogenated vinyl or vinylidene resin particles and fillers or pigments, which fillers or pigments are often incorporated in such compositions, tend to settle out and render the plastisol composition non-homogeneous and unsuitable for such films. It has presently been found that the addition of from 0.05% to 5.0%, preferably from 0.25% to 3.0%, by weight of the aforementioned silica aerogels or fume silicas combined with from about 0.02% to about 3.0% by weight of a silicone glycol copolymer such as, for example, DC 113, to such compositions will suitably thicken the composition to the point where such composition will overcome the aforementioned problems.

It has also been found possible to thicken and/or render thixotropic, polymerizable organic liquid compositions comprising polymerizable resins including solventless varnishes and polyester resin compositions which are used in coating, filling, adhesive, and laminating operations by incorporating small amounts of the silicone glycol copolymer and fume silica or silica aerogel therein. Such compositions include liquid alkyd resins or solutions of solid alkyd or polyester resins dispersed in a solvent (for example, styrene) which is usually copolymerizable with the polyester resin.

Other organic resin liquids which may be employed in combination with the (silicone glycol copolymer-silica material) thickening agent in a preferred embodiment of this invention are polymerizable liquids comprising unsaturated alkyd resins. These resins are the reaction products of (i) polyhydric alcohols, mixtures of polyhydric alcohols or mixtures of polyhydric and monohydric alcohols, and (ii) an alpha unsaturated alpha, beta carboxylic acid, or a plurality of polycarboxylic acids one of which at least is an unsaturated polycarboxylic acid. Examples of such polyhydric alcohols are ethylene glycol, di- and triethylene glycol, propylene glycol, tetramethylene glycol, glycerine or pentaerythritol in combination with a monohydric alcohol, etc. Examples of unsaturated polycarboxylic acids are maleic, fumaric and itaconic acids. The terms polycarboxylic acid as used herein is intended to include within its meaning the anhydrides of such acids which may also be employed. In addition to one or more of the unsaturated polycarboxylic acids, saturated polycarboxylic acids may also be present in the reaction mixture referred to above. Examples of such saturated polycarboxylic acids are succinic, adipic, sebacic, phthalic and terephthalic acids. The anhydrides of such acids may also be used instead of the acids or in combination therewith.

It has also been discovered that incorporating the thickening agent of this invention in a polyhydric alcohol per se (which falls within the general class of organic solvents), i.e., without any polymerization or reaction with other materials, consequently results in an alcohol having a greatly increased viscosity and being more thixotropic.

Instead of the above unsaturated alkyd resins, the polymerizable liquids which may be used in the compositions of the present invention may contain polymerizable substances such as, for example, esters of monohydric alcohols and polycarboxylic acids, including unsaturated polycarboxylic acids, halogenated aromatic polycarboxylic acids and polybasic inorganic acids. Examples of such substances are dialkyl maleate, dialkyl fumarate, dialkyl itaconate, and the like. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate, dibenzyl fumarate, and the like.

The above-described unsaturated resins may be liquids, or solids dissolved in organic liquids, and the thickening agent may be directly dispersed in the liquids. When the unsaturated resin is a solid, it is necessary to dissolve the resin in an organic solvent, preferably a solvent which is copolymerizable with the polyester resin, such as, for example, styrene or other liquid copolymerizable monomers.

There may also be incorporated in the above-described polymerizable liquid compositions containing the thickening agent of this invention, small amounts ranging from about 0.5% to 2.0% by weight, based on the weight of the polymerizable liquid, of a polymerization catalyst. Many types of polymerization catalysts, well known to those skilled in the art, may be incorporated in the polymerizable liquid compositions of this invention including for example, benzoyl peroxide, methyl ethyl ketone peroxide, cyclo-hexane peroxide, and cumene hydroperoxide, which provide the oxygen necessary to effect polymerization.

Additional organic resin liquids which may be thickened and/or rendered thixotropic include the well known epoxy resins; that is, resins based on ethylene oxide or its homologues or derivatives. The epoxy resins may be condensation polymers of epichlorohydrin and (a) bisphenol A [2,2-bis'(p-hydroxyphenyl)-propane,

(b) ethylene glycol, (c) glycerol, and/or (d) related hydroxyl-containing compounds, and have both epoxide

and hydroxyl groups, which are capable of further reaction with various modifiers or curing agents. These resins are usually pale amber in color and range from viscous liquids to brittle solids with softening points varying from 40° C. to 150° C. Several epoxy resins which are suitable for use in conjunction with the novel thickening agents of the present invention are commercially available under the trademarks Araldite, Bakelite, Epi-Rez, C–8, Devron, and Epon. Those epoxy resins which are liquid may be thickened as in the case of the other organic liquids described above. However, if the resins are in solid form, then such resin may be dissolved and/or dispersed in a solvent and the resultant liquid resin-solvent mixture may be thickened by the practice of the present invention. Furthermore, these liquid resin combinations may be utilized with suitable curing agents which are well known in the plastic art; for example, curing agents which may be mentioned include organic bases such as amines, acid anhydrides, and compounds containing active hydrogen.

A particularly useful embodiment of the present invention comprises organic thixotropic compositions comprising natural and/or synthetic polymers (i.e. organic resins) dissolved in a liquid medium and thickened with the silica materials in combination with the silicone glycol copolymer.

One preferred embodiment of the present invention is a thickening agent, useful for increasing the viscosity and thixotropy of an organic liquid, consisting essentially of particles of a finely divided, amorphous, organo-silica aerogel comprising a silica polymer having siloxy groups, said organo-silica aerogel being characterized in having an average particle size of between about 1.0 and 2.5 microns, a specific surface area of from about 100 to about 400 square meters per gram, and an external surface area of from about 1.70 to 1.95 square meters per gram, said aerogel being further characterized in containing from about 0.4% to about 1.2% by weight carbon and from about 0.9% to about 1.5% by weight hydrogen chemically bound to a portion of the siloxy groups; which particles are coated with a liquid silicone glycol copolymer having the structural formula

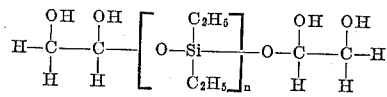

where $n$ is the range of about 7 to 14, preferably $n=10$, and the silicone glycol copolymer concentration is from about 0.02% to about 5.0% by weight, based on the weight of the silica aerogel particles.

Another preferred embodiment of the present invention is a composition of matter consisting essentially of (a) a liquid organic resin; (b) a finely divided, amorphous, organo-silica aerogel comprising a silica polymer having siloxy groups, said organo-silica aerogel being characterized in having an average particle size of between about 1.0 and 2.5 microns, a specific surface area of from about 100 to 400 square meters per gram, and an external surface area of from about 1.70 to 1.95 square meters per gram, said aerogel being further characterized in containing from about 0.4% to about 1.2% weight of carbon and from about 0.9% to about 1.5% by weight of hydrogen chemically bound to a portion of the siloxy groups, said aerogel being used in an amount of from about 0.05% to about 6.0% based on the weight of the said organic resin; and (c) a liquid silicone glycol copolymer having the structural formula

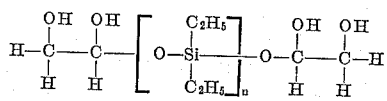

where $n$ is a number from 7–14 representing the average chain length of the copolymer, the silicone glycol copolymer concentration is from about 0.02% to about 5.0% by weight, based on the weight of the silica aerogel particles.

A further understanding of the processes and compositions of the present invention will be obtained from the following examples which are intended to illustrate the invention but not to limit the scope thereof, parts and percentages being by weight unless otherwise specified.

*Example I*

In order to more effectively illustrate the unique thickening properties of the present invention thickening agent, i.e., the silicone glycol copolymer and a silica aerogel or fume silica, when incorporated in various organic liquids and the resultant increase in viscosity and/or thixotropy, the following experimental information is presented. Approximately 100-gram samples of each of the silica materials listed in Table II, infra, were coated with a liquid silicone glycol copolymer (viscosity, centistokes at 25° C.=3,000) having the structural formula:

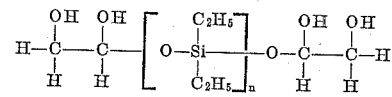

$n$ represents the average chain length and is a number in the range of about 7 to 14, by spraying said copolymer on the silica particles in a reductionizer which was being operated at an air pressure of approximately 70 p.s.i.g. The copolymer was maintained at a temperature of approximately 100° C. during the aforementioned procedure. (It will be noted that the fume silica used herein was in the form of a very fine powder and therefore was probably not further ground to a smaller particle size in the above mentioned reductionizer.) However, use of the reductionizer was a very effective way of applying the copolymer of the fume silica.

The amount of silicone glycol copolymer which was used with the 100-gram samples of the silica aerogel or fume silica was sufficient to yield the silicone glycol copolymer concentrations set forth in Table II. These concentrations (listed as parts of the copolymer per 100 parts $SiO_2$) are based on the total weight of the silica used, e.g., 0.5 grams silicone glycol copolymer per 100 grams silica or 0.5 part copolymer per 100 parts $SiO_2$.

The organic liquid to be thickened with the aforementioned thickening agent contained 40 parts of styrene in which was dissolved 60 parts of an unsaturated polyester resin. This resin was prepared by reacting 50 mol percent of phthalic anhydride and 50 mol percent of maleic anhydride with a 25% molar excess of propylene glycol, which excess of propylene glycol was thereafter distilled off leaving a solid, hard, brittle, unsaturated polyester resin.

To approximately 245-gram separate portions of the above liquid styrene-polyester resin compositions, there were separately added (a) 5 grams each of the coated silica materials having various concentrations of the silicone glycol copolymer thereon; (b) 5.0 grams of fume silica per se and (c) 5 grams of the aerogel per se; these compositions are summarized in Table II. Thus, it will be noted that not all of the compositions contained the silicone glycol copolymers. This particular point is made in order to show the sharp contrast between (1) organic liquids thickened with the thickening agent of the present invention which constitutes the silica aerogel or fume silica in combination with the aforementioned silicone glycol copolymer and (2) organic liquids thickened with the silica aerogel per se or fume silica per se which have been suggested as thickening agents by the prior art. The coated silica materials, aerogels per se, and fume silicas per se were then mechanically dispersed into the separate liquid resin compositions by means of mixing the materials together for a 4-minute period in an Eppenbach dis-

TABLE II

| Composition | Type Silica | Silica Wt. Percent Used [2] | Silicone Glycol Copolymer [1] Concentration [3] | Viscosity in Centipoises at 25° C. Brookfield RVT Helipath TA Spindle | | | Thixotropy Index [4] |
|---|---|---|---|---|---|---|---|
| | | | | 20 r.p.m. | 10 r.p.m. | 5 r.p.m. | |
| Liquid styrene-polyester resin | None | 0 | 0 | 700 | | 650 | |
| Do | Aerogel [5] | 2 | 0 | 1,750 | 1,950 | 2,100 | 1.20 |
| Do | do [5] | 2 | 0.5 | 2,200 | 2,550 | 2,800 | 1.27 |
| Do | do [5] | 2 | 0.9 | 2,875 | | 5,000 | 1.74 |
| Do | do [5] | 2 | 1.2 | 2,900 | 3,750 | 5,300 | [6] 1.83 |
| Do | do [5] | 2 | 1.3 | 3,200 | 4,300 | 5,600 | 1.75 |
| Do | do [5] | 3 | 1.9 | 3,300 | 4,500 | 5,750 | 1.74 |
| Do | do [5] | 2 | 3.2 | 3,550 | 4,700 | [6] 6,400 | 1.80 |
| Do | do [7] | 2 | 0 | 2,500 | 3,200 | 3,950 | 1.58 |
| Do | do [7] | 2 | 1.0 | 3,650 | 4,100 | 6,350 | 1.74 |

[1] Commercially available under the trade designation DC 113.
[2] Based on the weight of the composition, e.g. 2 parts SiO$_2$/98 parts composition.
[3] Based on parts copolymer/100 parts of silica used.
[4] Thixotropy index = $\frac{\text{viscosity at 5 r.p.m.}}{\text{viscosity at 20 r.p.m.}}$
[5] Silica Type 4 of Table I.
[6] Higher numerical value for viscosity and thixotropy indicates greater effectiveness.
[7] Silica Type 5 of Table I.

persion mixer. After 16–24 hours of aging, the viscosities of each of the compositions were then measured at 25° C. by a model RVT Brookfield Viscosimeter using a TA spindle at 20 r.p.m., 10 r.p.m., and 5 r.p.m. The values obtained from these measurements are shown in Table II.

It can readily be seen then from the data set forth in Table II that the utilization of the thickening agent of the present invention results in a substantial increase in viscosity and in thixotropy when incorporated in an organic liquid as contrasted to the utilization of the silica materials per se in such organic liquids as in prior art compositions.

*Example II*

Table III illustrates the results obtained by the utilization of organo-silica aerogels and fume silicas combined with a silicone glycol copolymer (same as the copolymer used in Example I) in three different types of organic liquids, i.e. mineral oil, glycerol, and N-butyl alcohol. Also shown in Table III are the results of the utilization of the said aerogel per se and fume silica per se in the aforementioned organic liquids in order to more effectively point out the contrast between the prior art compositions and the novel compositions of the present invention. The thickening agent, i.e. the type 4 (Table I) silica aerogel or type 5 (Table I) fume silica and the silicone glycol copolymer, was part of the same material which The viscosity of the above compositions at 25° C. was then measured by utilizing a Brookfield model LVT and a TA Spindle rotated at 6 r.p.m.

It can readily be seen from the values obtained from the viscosimeter readings that the novel compositions containing the thickening agent, i.e. the silicone glycol copolymer and either the organo-silica aerogel or the fume silica, are superior, i.e. have higher viscosity readings, than the compositions containing only the fume silica per se, or the silica aerogel per se, which aerogel per se represents the prior art compositions as exemplified by the Taulli patent, U.S. 3,210,273.

*Example III*

Table IV illustrates the results of the utilization of (1) the present invention thickening agent, i.e., the type 4 (Table I) silica aerogel or type 5 (Table I) fume silica and the silicone glycol copolymer described in Example I, (2) organo-silica aerogels per se, (3) and fume silicas per se, in a liquid epoxy resin which was prepared by the condensation of epichlorohydrin with Bisphenol A and which is commercially available under the trademark Epon 815. The thickening agent was part of the same material which was as described in the first paragraph of Example I. The thickening agent, the aerogel per se, and the fume silica per se were all dispersed in separate but

TABLE III

| Composition | Type Silica | Silica Wt Percent Used [2] | Silicone Glycol Copolymer [1] Concentration [3] | Viscosity in Centipoises at 25° C. Brookfield LVT Helipath TA Spindle. 6 r.p.m. |
|---|---|---|---|---|
| Mineral Oil | None | 0 | 0 | |
| Do | Fume [4] | 1 | 0 | 250 |
| Do | do [4] | 1 | 2.0 | 725 |
| Do | Aerogel [5] | 1 | 0 | 235 |
| Do | do [5] | 1 | 2.0 | 690 |
| Do | Fume [4] | 2 | 0 | 1,400 |
| Do | do [4] | 2 | 2.0 | [6] 3,820 |
| Do | Aerogel [5] | 2 | 0 | 1,200 |
| Do | do [5] | 2 | 2.0 | 3,400 |
| Glycerol | None | 0 | 0 | 8 |
| Do | Aerogel [5] | 1 | 0 | 600 |
| Do | Fume [4] | 1 | 0 | 670 |
| Do | Aerogel [5] | 1 | 2.0 | 1,100 |
| Do | Fume [4] | 1 | 2.0 | 1,250 |
| N-Butyl Alcohol | None | 0 | 0 | |
| Do | Aerogel [5] | 6 | 0 | 22 |
| Do | Fume [4] | 6 | 0 | 110 |
| Do | Aerogel [5] | 6 | 2.0 | 2,150 |
| Do | Fume | 6 | 2.0 | 2,300 |

[1] Commercially available under the trade designation DC 113.
[2] Based on the weight of the composition, e.g. 1 part SiO$_2$/98 parts composition.
[3] Based on parts of copolymer per 100 parts of silica used.
[4] Silica Type 5 of Table I.
[5] Silica Type 4 of Table I.
[6] Higher numerical value for viscosity indicates greater effectiveness.

was prepared as described in the first paragraph of Example I. The thickening agent, the said aerogel per se, and said fume silica per se were dispersed in the aforementioned liquids by an Abbe Ball Mill for 10 minutes.

equal portions of the liquid epoxy resin composition by the same technique as set forth in Example I. The viscosity measurements were conducted at 25° C. on a model RVT Brookfield Viscosimeter using a TA Spindle rotated at 20 r.p.m. and at 5 r.p.m. In this example, the liquid epoxy resin compositions were aged for 24 hours at 25° C. after which time the viscosity of each composition was determined. It can readily be seen from the values set forth in Table IV that the liquid epoxy resins containing the present invention thickening agent; i.e., silicone glycol copolymer and the organo-silica aerogel or fume silica, were superior, i.e., have higher viscosity readings, than the compositions which contained only the silica aerogel per se or the fume silica per se.

In view of the aforementioned examples and the data set forth therein, it can readily be seen that a large variety of organic liquids can be thickened with the present invention thickening agent, i.e., the combination of a silicone glycol copolymer and a silica aerogel or a fume silica, to provide thickened liquids which have substantially more thixotropy and a significantly higher viscosity than the same organic liquids thickened only with the silica materials per se, when compared on an equal silica weight basis.

The procedure set forth in Example I was repeated in order to demonstrate the distinction between a prior art "coated" aerogel and the present invention thickening agent. Specifically, U.S. Patent 2,870,108 discloses and suggests the use of certain organic alkyl silicate-coated aerogels as a thickening agent. The organic silicate described in this patent has the general formula

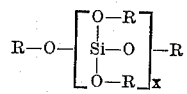

wherein R is an alkyl radical having from 1 to 6 carbon atoms and $x$ is an integer from 1 to 20. First, Example I of U.S. Patent 2,870,108 (column 9, lines 62–75 and column 10, lines 1–16), relating to the production of an aerogel coated with a discontinuous film of polymerized tetraethyl orthosilicate, was carried out in the same manner (but including different amounts of said silicate to yield various "coating" concentrations) as described therein. The silica aerogel used was of the type described in U.S. Patent 2,093,454 and which is described as a preferred aerogel in U.S. Patent 2,870,108.

The same silica aerogel (of U.S. Patent 2,093,454) was used pursuant to the procedure set forth in Example I of the present invention; i.e. 100-gram samples of such a silica aerogel were coated at various levels with the silicone glycol copolymer described in Example I and in the same manner.

The organic silicate-coated aerogel (U.S. Patent 2,870,108) and the silicone glycol copolymer-coated aerogel (present invention) were incorporated in the polyester resin-styrene liquid compositions in the same manner as described in the present specification Example I and at the various concentrations set forth in Table V.

From Table V, it can readily be seen then that the values obtained from these viscosity measurements show that the silica aerogel (U.S. Patent 2,093,454) when used in combination with a silicone glycol copolymer (present invention) and incorporated in a liquid styrene-polyester resin was from about 2 to about 4 times more effective (at various concentrations and Spindle numbers) in increasing the viscosity of such liquid resin as the aerogel coated with tetraethyl orthosilicate (U.S. 2,870,108) on an equivalent silica weight and "coating" concentration basis.

An additional experiment was performed in order to contrast the effectiveness as a thickening agent between (1) the present invention thickening agents, i.e. a silica aerogel coated with a silicone glycol copolymer hereinbefore defined, and (2) a silica aerogel coated with a silicone oil. This latter silicone oil coated aerogel is exemplified by the coated silica aerogels set forth and claimed in U.S. Patent 2,870,109 which are described as being useful as reinforcing fillers in silicone gums or rubbers. Spe-

TABLE IV

| Composition | Type Silica | Silica Wt. percent Used [2] | Silicone Glycol Copolymer [1] Concentration [3] | Viscosity in Centipoises at 25° C. Brookfield RVT Helipath TA Spindle | | Thixotropy Index [4] |
|---|---|---|---|---|---|---|
| | | | | 20 r.p.m. | 5 r.p.m. | |
| Epoxy resin [5] | None | 0 | 0 | 640 | 640 | 1.00 |
| Do | Fume [6] | 3 | 0 | 1,480 | 1,520 | 1.03 |
| Do | Aerogel [7] | 3 | 0 | 3,000 | 5,200 | 1.73 |
| Do | do [7] | 3 | 2.0 | 5,160 | [8] 10,120 | [7] 1.96 |
| Do | Fume [6] | 3 | 2.0 | 5,050 | 9,750 | 1.93 |

[1] Commercially available under the trade designation DC 113.
[2] Based on the weight of the composition, e.g. 3 parts Si₂/98 parts composition.
[3] Based on parts copolymer/100 parts of silica used.
[4] Thixotropy index = viscosity at 5 r.p.m. / viscosity at 20 r.p.m.
[5] Commercially available under the trademark Epon-815 (the composition also contained 2 parts resorcinol/100 parts resin).
[6] Silica Type 5 of Table I.
[7] Silica Type 4 of Table I.
[8] Higher numerical value for viscosity and thixotropy indicates greater effectiveness.

TABLE V

| Composition | Type Silica | Silica Wt. Percent Used [2] | U.S. 2,870,108 Tetraethyl orthosilicate concentration [3] | Present Invention Silicone glycol copolymer [1] concentration [3] | Viscosity in Centipoises at 25° C. Brookfield RVT Helipath TA Spindle | | Thixotropy Index [4] |
|---|---|---|---|---|---|---|---|
| | | | | | 20 r.p.m. | 5 r.p.m. | |
| Polyester resin-styrene liquid | None | 0 | 0 | 0 | 700 | 650 | |
| Do | Aerogel [5] | 1 | 0 | 0 | 1,100 | 1,400 | 1.27 |
| Do | do [5] | 1 | .5 | 0 | 1,250 | 1,600 | 1.28 |
| Do | do [5] | 1 | 0 | .5 | 1,500 | 2,050 | 1.37 |
| Do | do [5] | 2 | 0 | 0 | 1,450 | 1,800 | 1.24 |
| Do | do [5] | 2 | 1.0 | 0 | 2,050 | 2,500 | 1.22 |
| Do | do [5] | 2 | 0 | 1.0 | 2,800 | 4,850 | 1.74 |
| Do | do [5] | 2 | 2.0 | 0 | 2,500 | 3,275 | 1.31 |
| Do | do [5] | 2 | 0 | 2.0 | 3,150 | 5,100 | 1.62 |
| Do | do [5] | 3 | 0 | 0 | 2,150 | 2,675 | 1.24 |
| Do | do [5] | 3 | 3.0 | 0 | 2,850 | 3,600 | 1.26 |
| Do | do [5] | 3 | 0 | 3.0 | [6] 3,400 | [6] 6,000 | [6] 1.77 |

[1] Commercially available under the trade designation DC 113.
[2] Based on the weight of the composition, e.g. 2 parts SiO₂/98 parts composition.
[3] Based on parts of orthosilicate or copolymer/100 parts of silica used.
[4] Thixotropy index = viscosity at 5 r.p.m. / viscosity at 20 r.p.m.
[5] Type silica aerogel described and claimed in U.S. Patent 2,093,454.
[6] Higher numerical value for viscosity and thixotropy indicates greater effectiveness.

cifically, Example II (column 6, lines 34–54, of U.S. Patent 2,870,109) was repeated with the exception that various quantities of the methyl silicone oil were utilized in order to produce a silicone oil coated aerogel containing concentrations of 1%, 2%, and 3% by weight of said oil based on the weight of the silica aerogel. The aerogel used was the same as the type described in U.S. Patent 2,093,454 and had an "acid number" below 0.8.

By way of contrast, an example of the thickening agents of the present invention was prepared by coating the same silica aerogel (U.S. Patent 2,093,454) with a silicone glycol copolymer (same as the type described in the present invention Example I) during the grinding operation in the reductionizer and in the same manner as that described with reference to the aforementioned (present invention) Example I. The amount of silicone glycol copolymer utilized was sufficient to provide a concentration on said aerogel of 1%, 2%, and 3% by weight of such copolymer based on the weight of the silica aerogel.

Five (5) gram samples of (1) the aforementioned silicone oil coated aerogel (U.S. Patent 2,870,109) and (2) the thickening agents of the present invention were then added to approximately 245-gram portions of the liquid styrene-polyester resin of the type utilized in (present invention) Example I heretofore described. The 5-gram samples were dispersed in the said resin by means similar to the dispersion manner set forth in Example I. Thereafter, viscosity measurements (obtained in the same manner as in Example I) were conducted on each of the resulting compositions which contained 2% by weight of said aerogel coating with various concentrations of (1) the silicone glycol copolymer of the present invention and (2) the methyl silicone oil of U.S. Patent 2,870,109. The values obtained from these viscosity measurements showed that the thickening agents of the present invention (when incorporated in the polyester resin) were 3 to 5 times as effective in increasing the viscosity of said resin as the silicone oil-coated silica aerogel (U.S. Patent 2,870,109), when employed on an equal silica weight basis and at equal coating concentrations.

The example set forth immediately above was again repeated with the exception that an oleaginous liquid, an S.A.E. 30 weight automotive lubricating oil, was used instead of the liquid polyester resin-styrene composition. The values obtained from the viscosity measurements conducted on the oleaginous liquid thickened with the present invention thickening agent were similar to the values set forth in Table III (the data therein pertaining to a mineral oil thickened with 2% by weight silica aerogel having a silicone glycol copolymer concentration of 2 parts of said glycol per 100 parts of said aerogel). The viscosity values of the oleaginous liquid containing the silica aerogel coated with the methyl silicone oil (U.S. Patent 2,870,109) were not significantly higher, i.e. <100 centistoke increase, than the viscosity of the lubricating oil per se.

What is claimed is:

1. A composition of matter comprising (a) a silica material selected from the group consisting of fume silica, silica aerogel, and mixtures thereof; in admixture with (b) a silicone glycol copolymer having the formula

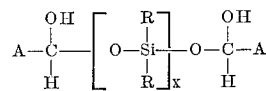

wherein R is an alkyl group having 1 to 4 carbon atoms; A is selected from the group consisting of hydrogen, alkyl group having 1 to 3 carbon atoms and hydroxy substituted alkyl groups having 1 to 3 carbon atoms; and $x$ is an integer representing the number of units in the molecular chain and has a value of from about 1 to about 25, said glycol copolymer being present in an amount of from about 0.02% to about 5.0% by weight, based on the weight of said silica material.

2. The composition as set forth in claim 1 wherein the silica material is an organo-silica aerogel; A is $CH_2OH$; and $x$ is from 5 to about 15.

3. A thickening agent used for increasing the viscosity and thixotropy of an organic liquid consisting essentially of (a) a finely divided, amorphous, organo-silica aerogel comprising a silica polymer having siloxy groups, said organo-silica aerogel being characterized in having an average particle size of between about 1.0 and 2.5 microns, a specific surface area of from about 100 to about 400 square meters per gram, and an external surface area of from about 1.70 to 1.95 square meters per gram, said aerogel being further characterized in containing from about 0.4% to about 1.2% by weight carbon and from about 0.9% to about 1.5% by weight hydrogen chemically bound to a portion of the siloxy groups; and (b) a silicone glycol copolymer having the structural formula

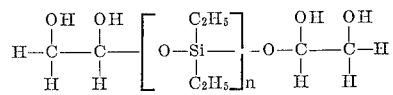

where $n$ is in the range of from about 7 to about 14 and the silicone glycol copolymer concentration is from about 0.02% to about 5.0% by weight, based on the weight of the silica aerogel.

4. A composition of matter comprising a mixture of (a) an organic liquid; (b) a silica material selected from the group consisting of fume silica, silica aerogel, and mixtures thereof; and (c) a silicone glycol copolymer having the formula

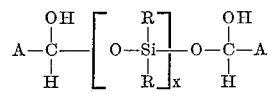

wherein R is an alkyl group having 1 to 4 carbon atoms; A is selected from the group consisting of hydrogen, alkyl group having 1 to 3 carbon atoms and hydroxy substituted alkyl groups having 1 to 3 carbon atoms; and $x$ is an integer representing the number of units in the molecular chain and has a value of from about 1 to about 25, the amount of (b) and (c) being sufficient to increase the viscosity of said organic liquid.

5. The composition set forth in claim 4 wherein (1) the silica material is a finely divided, amorphous, organo-silica aerogel comprising a silica polymer having siloxy groups, said organo-silica aerogel being characterized in having an average particle size of between about 1.0 and 2.5 microns, a specific surface area of from about 100 to 400 square meters per gram, and an external surface area of from about 1.70 to 1.95 square meters per gram, said aerogel being further characterized in containing from about 0.4% to about 1.2% by weight of carbon and from about 0.9% to about 1.5% by weight of hydrogen chemically bound to a portion of the siloxy groups, said aerogel being used in an amount of from about 0.05% to about 6.0% based on the weight of the organic liquid; (2) the silicone glycol copolymer concentration is from about 0.02% to about 5.0% by weight, based on the weight of the silica aerogel; and (3) A in the formula is $CH_2OH$.

6. The composition set forth in claim 5 wherein the organic liquid is an organic solvent having dissolved therein an organic film forming material of high molecular weight.

7. The composition set forth in claim 5 wherein the organic liquid is a liquid plastisol comprising a polymer selected from the group consisting of halogenated vinyl and vinylidene polymers suspended in a liquid plasticizer for said polymer.

8. The composition set forth in claim 5 wherein the organic liquid is an organic solvent having dissolved therein an unsaturated solid alkyd resin of polyhydroxy alcohol and an unsaturated polycarboxylic acid, said solvent being polymerizable with said resin.

9. The composition set forth in claim 5 wherein the organic liquid is a polymerizable liquid comprising a liquid unsaturated alkyd resin obtained by the esterification of a mixture of ingredients comprising (1) a polyhydric alcohol and (2) an acid selected from the group consisting of saturated and unsaturated polycarboxylic acids.

10. The composition of claim 5 wherein the organic liquid is an oleaginous liquid selected from the group consisting of lubricating oils, animal oil, vegetable oil, and mixtures thereof.

11. The composition of claim 5 wherein the organic liquid is a liquid organic resin consisting of a liquid epoxy resin which is the condensation polymer of epichlorohydrin and Bisphenol A.

12. A composition of matter consisting essentially of (a) a liquid, organic styrene-polyester resin; (b) a finely divided, amorphous, organo-silica aerogel comprising a silica polymer having siloxy groups, said organo-silica aerogel being characterized in having an average particle size of between about 1.0 and 2.5 microns, a specific surface area of from about 100 to 400 square meters per gram, and an external surface area of from about 1.70 to 1.95 square meters per gram, said aerogel being further characterized in containing from about 0.4% to about 1.2% by weight of carbon and from about 0.9% to about 1.5% by weight of hydrogen chemically bound to a portion of the siloxy groups, said aerogel being used in an amount of from about 0.05% to about 6.0% based on the weight of the said organic resin and (c) a silicone glycol copolymer having the structural formula

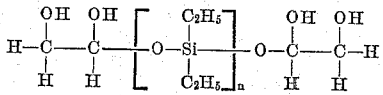

where $n$ is in the range of about 7 to about 14 and the silicone glycol copolymer concentration is from about 0.02% to about 5.0% by weight, based on the weight of the silica aerogel.

References Cited
UNITED STATES PATENTS

| | | |
|---|---|---|
| 2,756,212 | 7/1956 | Hotten. |
| 2,887,461 | 5/1959 | Hort _____ 252—28 |
| 2,890,170 | 6/1959 | Ragborg _____ 252—28 |
| 2,892,730 | 6/1959 | Kloepfer et al. _____ 252—28 |
| 2,894,969 | 7/1959 | Pierce _____ 252—28 |
| 3,011,975 | 12/1961 | Nitzsche et al. _____ 252—29 |
| 3,131,148 | 4/1964 | Taulli et al. _____ 252—28 |
| 3,192,157 | 6/1965 | Gowdy _____ 252—28 |
| 3,210,273 | 10/1965 | Taulli et al. _____ 252—28 |

DANIEL E. WYMAN, *Primary Examiner.*

I. VAUGHN, *Assistant Examiner.*